US012133048B2

(12) United States Patent
Takayasu et al.

(10) Patent No.: US 12,133,048 B2
(45) Date of Patent: Oct. 29, 2024

(54) SOUND EMITTING APPARATUS

(71) Applicant: KABUSHIKI KAISHA TOSHIBA, Tokyo (JP)

(72) Inventors: Toshiki Takayasu, Kawasaki (JP); Tatsuhiko Goto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 127 days.

(21) Appl. No.: 17/822,197

(22) Filed: Aug. 25, 2022

(65) Prior Publication Data

US 2023/0300535 A1 Sep. 21, 2023

(30) Foreign Application Priority Data

Mar. 17, 2022 (JP) ................................. 2022-042834

(51) Int. Cl.
*H04R 17/00* (2006.01)
*H04R 1/02* (2006.01)
*H04R 1/28* (2006.01)

(52) U.S. Cl.
CPC ............. *H04R 17/00* (2013.01); *H04R 1/025* (2013.01); *H04R 1/2811* (2013.01); *H04R 2400/11* (2013.01)

(58) Field of Classification Search
CPC ...... H04R 17/00; H04R 1/025; H04R 1/2811; H04R 2400/11; H04R 17/10
See application file for complete search history.

(56) References Cited

U.S. PATENT DOCUMENTS

| | | | | |
|---|---|---|---|---|
| 6,747,395 B1 * | 6/2004 | Satoh | H04R 17/005 | 310/327 |
| 8,670,578 B2 | 3/2014 | Onishi et al. | | |
| 2008/0048525 A1 * | 2/2008 | Fujiwara | H04R 17/00 | 310/321 |
| 2009/0045700 A1 * | 2/2009 | Sasaki | H04R 17/00 | 310/348 |
| 2013/0064041 A1 * | 3/2013 | Onishi | H04R 3/00 | 310/334 |
| 2014/0022026 A1 * | 1/2014 | Onishi | G10K 9/122 | 331/154 |
| 2014/0139071 A1 * | 5/2014 | Yamamoto | H10N 30/87 | 310/322 |
| 2022/0303372 A1 * | 9/2022 | Choi | G06F 1/1656 | |

FOREIGN PATENT DOCUMENTS

| | | | | |
|---|---|---|---|---|
| CN | 202103842 U * | 1/2012 | H04R 17/00 |
| CN | 105745941 A * | 7/2016 | H04R 1/10 |
| JP | 2004023436 A * | 1/2004 | H04R 17/00 |
| JP | 2012-119882 A | 6/2012 | |
| JP | 5359818 B2 | 12/2013 | |

* cited by examiner

*Primary Examiner* — Oyesola C Ojo
(74) *Attorney, Agent, or Firm* — Oblon, McClelland, Maier & Neustadt, L.L.P.

(57) ABSTRACT

According to an embodiment, a sound emitting apparatus includes a vibrator, a holding part, and a fixing part. The holding part is configured to hold the vibrator. The fixing part is configured to fix the holding part. A stiffness of the fixing part is lower than a stiffness of the holding part.

20 Claims, 19 Drawing Sheets

SOUND EMITTING APPARATUS

CROSS-REFERENCE TO RELATED APPLICATION

This application is based upon and claims the benefit of priority from prior Japanese Patent Application No. 2022-42834, filed Mar. 17, 2022, the entire contents of which are incorporated herein by reference.

FIELD

Embodiments described herein relate generally to a sound emitting apparatus.

BACKGROUND

In recent years, a sound source such as a noise control apparatus or a sound reproduction apparatus, which can generate high-output sound in a low frequency band is widely used. As the sound source, a dedicated speaker such as a woofer, which is good at reproducing low frequency sound, is normally used. However, the sound source good at reproducing low frequency sound is a bulky and heavy object in general, and it is intensively required to make it compact and lightweight from the viewpoint of extending the application range.

As a compact and lightweight sound source, a sound emitting apparatus (for example, a piezoelectric speaker or a piezoelectric buzzer) using a piezoelectric transducer has been developed mainly for portable electronic devices such as a portable telephone and a tablet terminal. However, normally, when the size and weight are reduced, the resonance frequency rises, and therefore, the apparatus is not suitable for low frequency sound reproduction.

DETAILED DESCRIPTION

According to an embodiment, a sound emitting apparatus includes a vibrator, a holding part, and a fixing part. The holding part is configured to hold the vibrator. The fixing part is configured to fix the holding part. A stiffness of the fixing part is lower than a stiffness of the holding part.

According to an embodiment, there is provided a compact and lightweight sound emitting apparatus capable of generating high-output sound in a low frequency band.

Hereinafter, embodiments will be described with reference to the accompanying drawings. In some drawings, one or more components are not shown.

First Embodiment

FIGS. 1, 2, 3, and 4 are a perspective view, a front view, a side view, and an exploded perspective view, respectively, schematically showing a sound emitting apparatus 10 according to the first embodiment. As shown in FIGS. 1, 2, 3, and 4, the sound emitting apparatus 10 includes a vibrator 11, a holding part 12, and a fixing part 13.

The vibrator 11 is a compact and lightweight vibration device. The vibration device is configured to vibrate upon receiving an electrical signal (for example, a voltage signal) from an electrical circuit (not shown) and generate sound according to the vibration. As the vibrator 11, for example, a piezoelectric transducer may be used.

Figure 1:
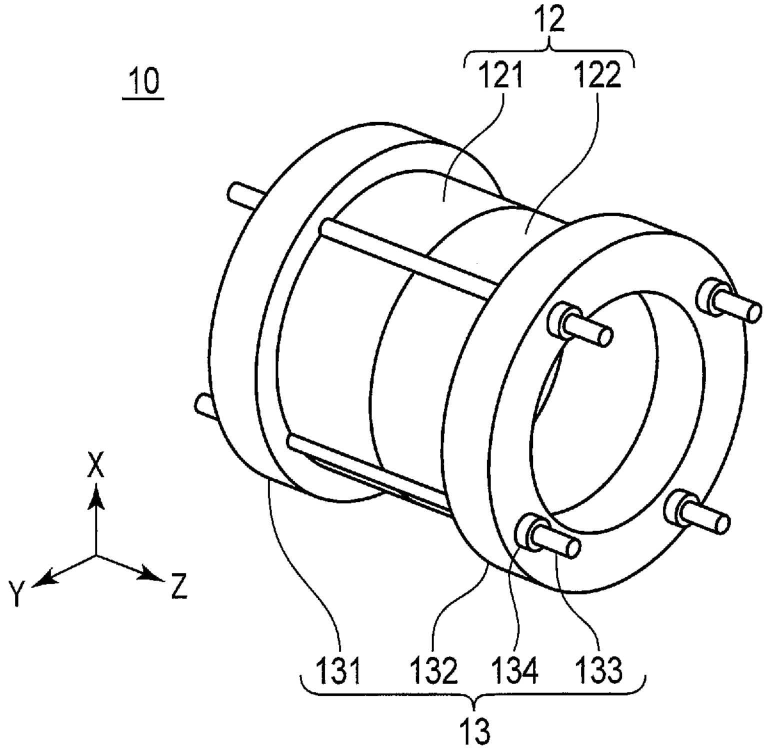
FIG. 1 is a perspective view showing a sound emitting apparatus according to the first embodiment.
Figure 2:
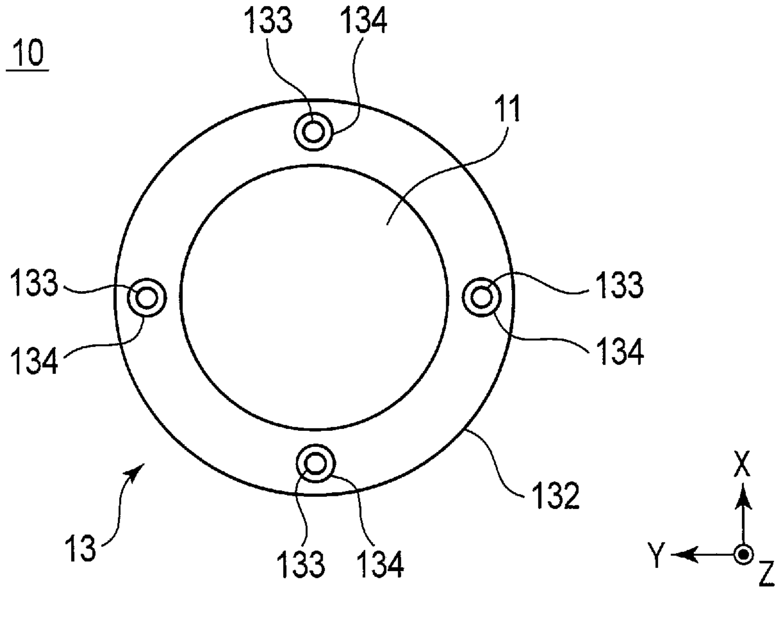
FIG. 2 is a front view showing the sound emitting apparatus according to the first embodiment.
Figure 3:
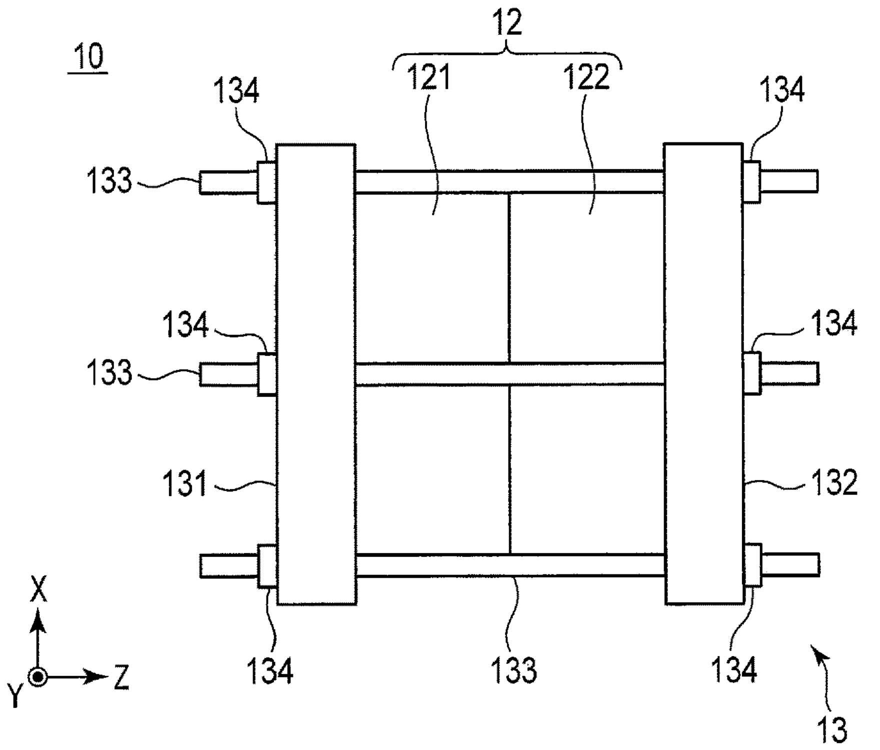
FIG. 3 is a side view showing the sound emitting apparatus according to the first embodiment.
Figure 4:
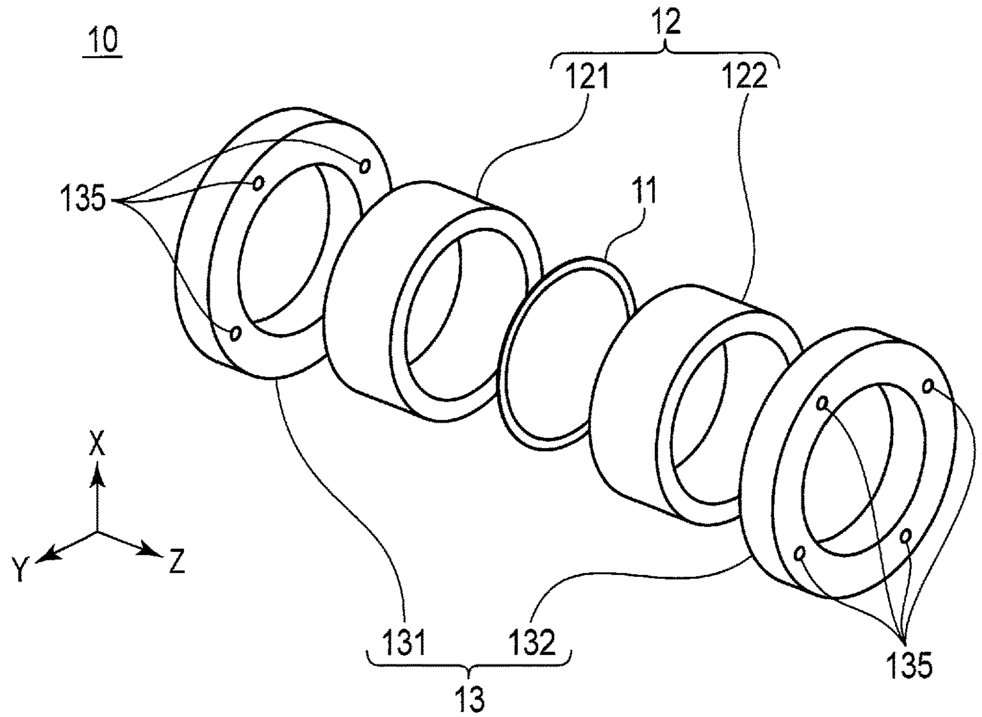
FIG. 4 is an exploded perspective view showing the sound emitting apparatus according to the first embodiment.
Figure 5A:
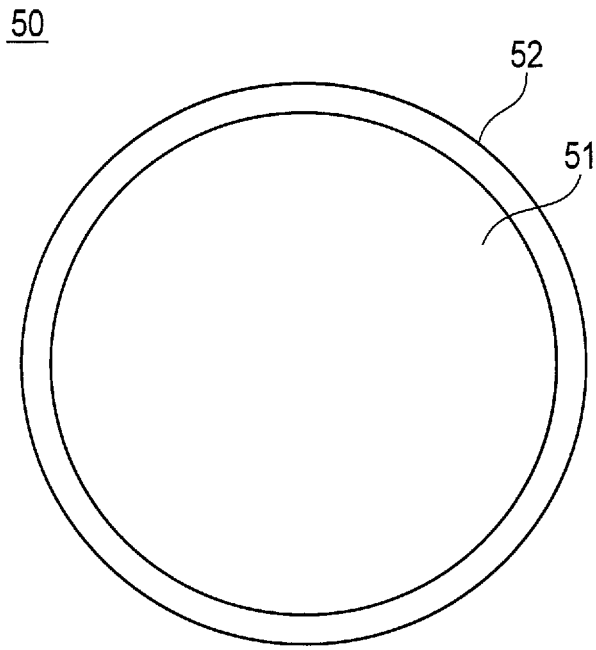
FIG. 5A is a front view showing a piezoelectric transducer that is an example of a vibrator according to the first embodiment.
Figure 5B:
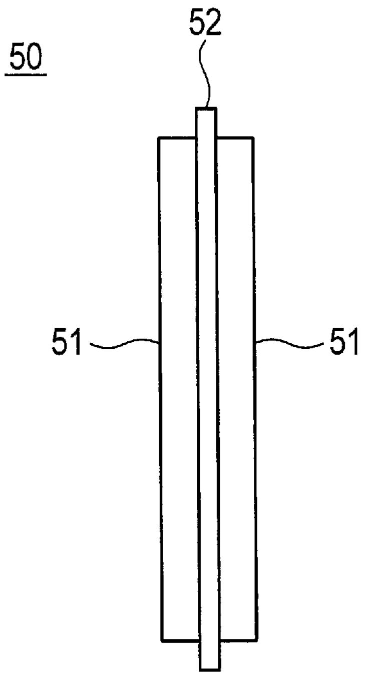
FIG. 5B is a side view showing the piezoelectric transducer that is an example of the vibrator according to the first embodiment.

FIGS. 5A and 5B schematically show a piezoelectric transducer 50 that is an example of a piezoelectric transducer usable as the vibrator 11. As shown in FIGS. 5A and 5B, the piezoelectric transducer 50 is a bimorph type piezoelectric transducer with piezoelectric elements 51 adhered to both surfaces of a circular metal plate 52. A unimorph type piezoelectric transducer with a piezoelectric element adhered to one surface of a metal plate or a multilayered type piezoelectric vibrator formed by stacking piezoelectric elements may also be used.

Referring back to FIGS. 1, 2, 3, and 4, the holding part 12 holds the vibrator 11. In the present embodiment, the holding part 12 is a two split type metal annular holder that holds the peripheral edge of the vibrator 11 by surface contact. Specifically, the holding part 12 includes a pair of holding members 121 and 122 each of which is made of a metal and has an annular shape. The holding members 121 and 122 sandwich the peripheral edge of the vibrator 11, thereby holding the vibrator 11.

Note that the holding part 12 shown in FIGS. 1, 2, 3, and 4 is merely an example, and the configuration of the holding part 12 is not limited to the above-described configuration. For example, the holding part 12 may be a single holding member corresponding to the integration of the holding members 121 and 122.

The fixing part 13 fixes the holding part 12. In the present embodiment, the fixing part 13 is a two split type plastic annular holder that holds the holding part 12 by sandwiching both end faces of the holding part 12. Specifically, the fixing part 13 includes a pair of fixing members 131 and 132 each of which is made of plastic and has an annular shape, stud bolts (threaded rods) 133, and nuts 134. Plastic is an example of an elastic material. The stiffness of the fixing part 13 (specifically, the fixing members 131 and 132) is lower than the stiffness of the holding part 12. The fixing members 131 and 132 are fastened by the nuts 134 and the stud bolts 133 arranged along the axial direction of the sound emitting apparatus (that is, in parallel to the Z-axis shown in FIGS. 2, 3, and 4). Here, the axial direction of the sound emitting apparatus 10 is a direction orthogonal to the principal surface of the vibrator 11. The fixing members 131 and 132 include through holes 135. In a state in which the holding part 12 is placed between the fixing members 131 and 132, the stud bolts 133 are inserted into the through holes 135 of the fixing members 131 and 132, and the nuts 134 threadably engage with the stud bolts 133. By the threaded engagement of the nuts 134, a clamping force along the axial direction of the sound emitting apparatus 10 is generated, and the fixing part 13 supports the holding part 12 by the clamping force. Accordingly, the holding part 12 is elastically supported (flexibly supported) by the fixing part 13, and the vibrator 11 is thus elastically supported.

Note that the fixing part 13 shown in FIGS. 1, 2, 3, and 4 is merely an example, and the configuration of the fixing part 13 is not limited to the above-described configuration. For example, the fixing part 13 may have any configuration if it can elastically support the holding part 12. Elastic support means a supporting method for permitting the displacement of the holding part 12 in the axial direction of the sound emitting apparatus 10.

The shapes of the components shown in FIGS. 1, 2, 3, and 4 are merely examples, and the shapes of the components are not limited to these. For example, the vibrator 11, the holding part 12, and the fixing part 13 may have a polygonal shape.

Figure 6:
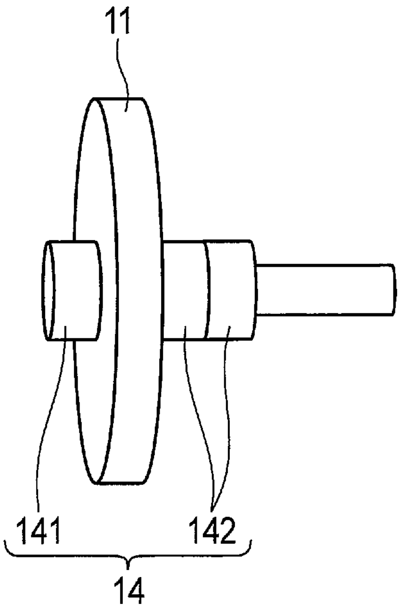
FIG. 6 is a side view showing a state in which a load weight is attached to the vibrator according to the first embodiment.

In the sound emitting apparatus 10, as shown in FIG. 6, a load weight 14 may be attached to the vibrator 11 to make the resonance frequency of the sound emitting apparatus 10 transition to a low frequency band. The load weight 14 is provided to add a mass to the vibrator 11. For example, the load weight 14 includes a plastic bolt 141, and one or more plastic nuts 142 (in this example, two plastic nuts 142). A through hole is provided at the center of the vibrator 11. The plastic bolt 141 is inserted into the through hole of the vibrator 11, and the plastic nuts 142 threadably engage with the plastic bolt 141.

Figure 7:
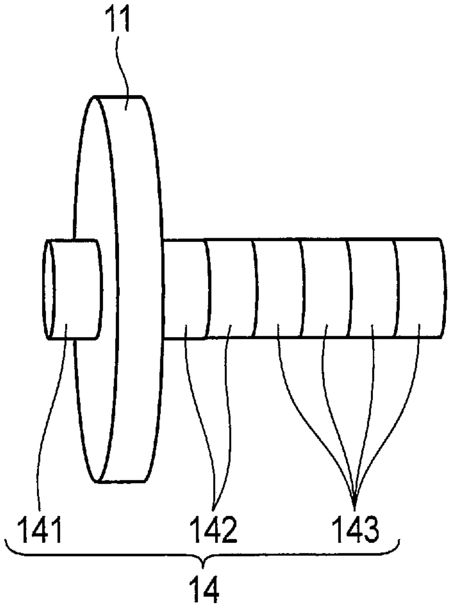
FIG. 7 is a side view showing a state in which a load weight is attached to the vibrator according to the first embodiment.

As shown in FIG. 7, the load weight 14 may further include one or more metal nuts 143 (in this example, four metal nuts 143) to increase the mass added to the vibrator 11. The metal nuts 143 threadably engage with the plastic bolt 141 in the rear stage of the plastic nut 142.

The load weight 14 shown in FIG. 6 or 7 is merely an example, and the configuration of the load weight 14 attached to the vibrator 11 is not limited to the configuration shown in FIG. 6 or 7. For example, in the configuration shown in FIG. 6, a metal bolt may be used in place of the plastic bolt 141. Also, the load weight 14 may be not the combination of the bolt and nuts but an elastic member such as a rubber plate.

Figure 8:
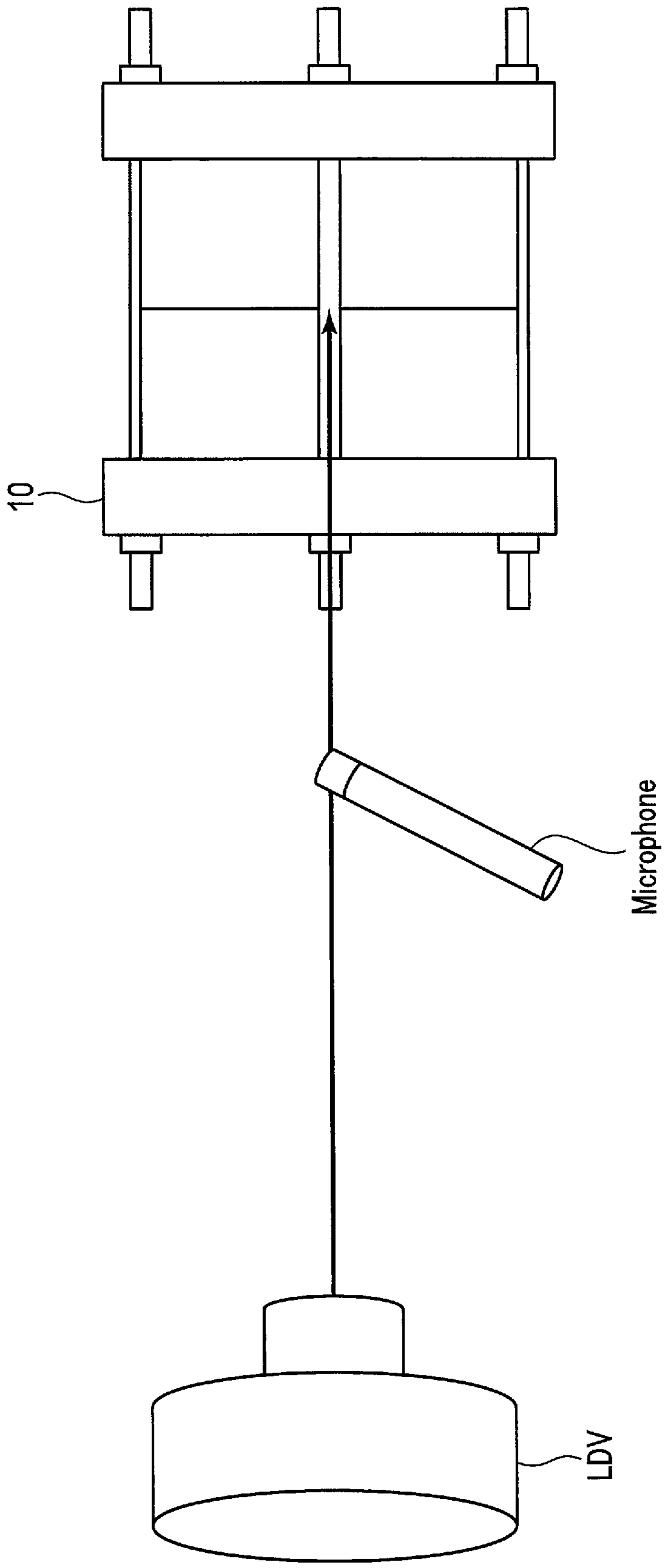
FIG. 8 is a view for explaining the outline of a principle verification test for a method according to the first embodiment.

The outline of a principle verification test for a method (proposed method) according to the present embodiment will be described next with reference to FIG. 8. In this test, a sweep signal (500 Hz≤f≤2 kHz) amplified by an amplifier (class D amplifier) was input to the sound emitting apparatus 10 to drive the sound emitting apparatus 10. A vibration velocity in the axial direction at the vibration observation point located almost at the center of the vibrator 11, and a radiated sound pressure at a sound pressure observation point apart from the surface of the vibrator 11 by a predetermined distance were measured. To measure the vibration velocity, an LDV (Laser Doppler Vibrometry) was used, and to measure the sound pressure, a microphone was used. As the vibrator 11, a bimorph transducer including a metal plate (stainless steel) and piezoelectric elements (lead zirconate titanate (PZT)) provided on both surfaces of the metal plate was used. An outer diameter Ro of the vibrator 11 was 45 mm, and a through hole (inner diameter Ri: 3 mm) was provided at the center of the vibrator 11. The through hole is used to attach the load weight 14 to the vibrator 11. The primary resonance frequency of the vibrator 11 in free support was about 1.3 kHz. Free support means a supporting method for permitting translational displacement and rotational displacement of the vibrator 11. As the holding part 12, a two split type metal annular holder (aluminum alloy) was used. As the fixing part 13, a two split type plastic annular holder (ABS: Acrylonitrile Butadiene Styrene) was used.

Figure 9:
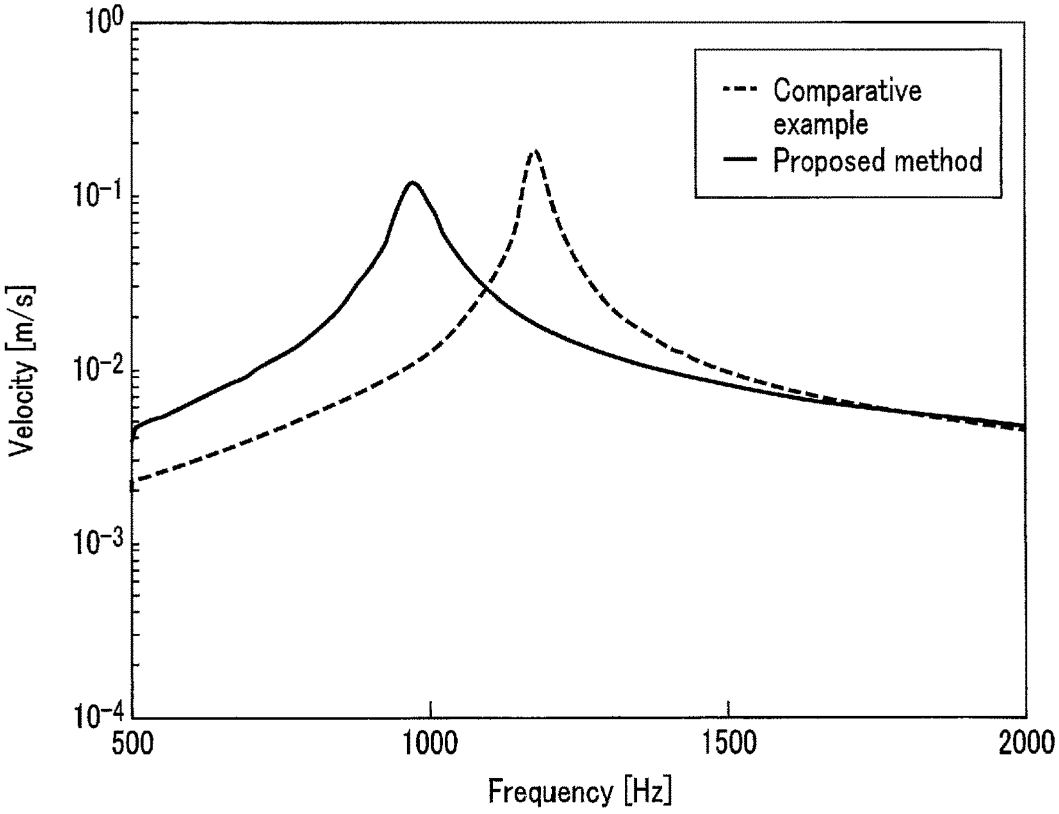
FIG. 9 is a graph showing the frequency characteristic of the axial vibration velocity of the vibrator according to the first embodiment.
Figure 10:
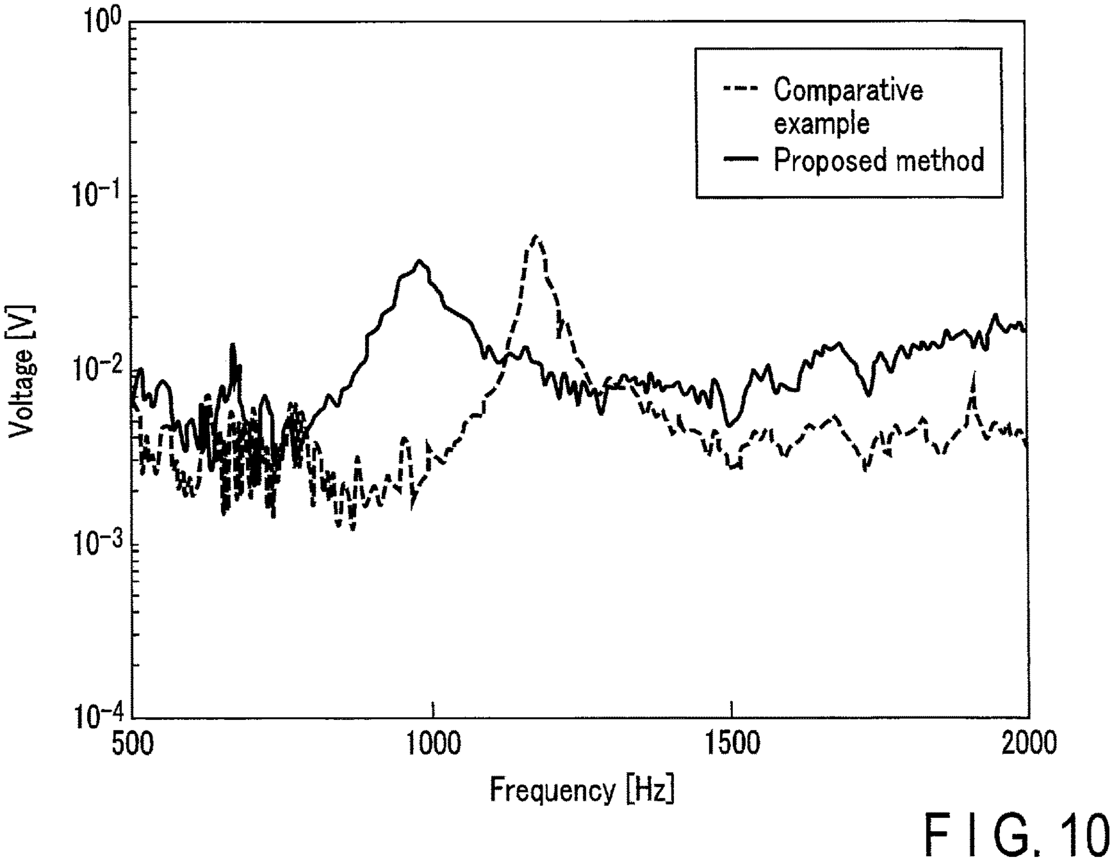
FIG. 10 is a graph showing the frequency characteristic of the radiated sound pressure of the sound emitting apparatus according to the first embodiment.

FIGS. 9 and 10 show the results of the principle verification test for the proposed method. Specifically, FIG. 9 shows the frequency characteristic of the axial vibration velocity of the vibrator 11 measured by the above-described method, and FIG. 10 shows the frequency characteristic of the radiated sound pressure measured by the above-described method. FIGS. 9 and 10 also show the results of a test concerning a sound emitting apparatus according to a comparative example. The sound emitting apparatus according to the comparative example is formed by removing the holding part 12 from the sound emitting apparatus 10 according to the present embodiment. That is, in the sound emitting apparatus according to the comparative example, the vibrator 11 is directly supported by the fixing part 13, and the vibrator 11 is rigidly supported as compared to the proposed method.

As shown in FIGS. 9 and 10, the resonance frequency of the sound emitting apparatus according to the comparative example almost equals the primary resonance frequency of the vibrator 11, but the resonance frequency of the sound emitting apparatus 10 according to the present embodiment is about 1,000 Hz, which is lower than the primary resonance frequency of the vibrator 11. It is therefore found that when the vibrator 11 is held via the holding part 12, the resonance frequency can be made to transition to a low frequency band. Furthermore, the sound emitting apparatus 10 according to the present embodiment has a wide resonance peak and can reproduce low frequency sound in a wider band, as compared to the sound emitting apparatus according to the comparative example.

Also, a test for verifying the effect of mass addition to the vibrator 11 was conducted. Mass addition to the vibrator 11 was done by the method described with reference to FIGS. 6 and 7, and the axial vibration velocity and the radiated sound pressure of the vibrator 11 were measured by the same method as described above.

Figure 11:
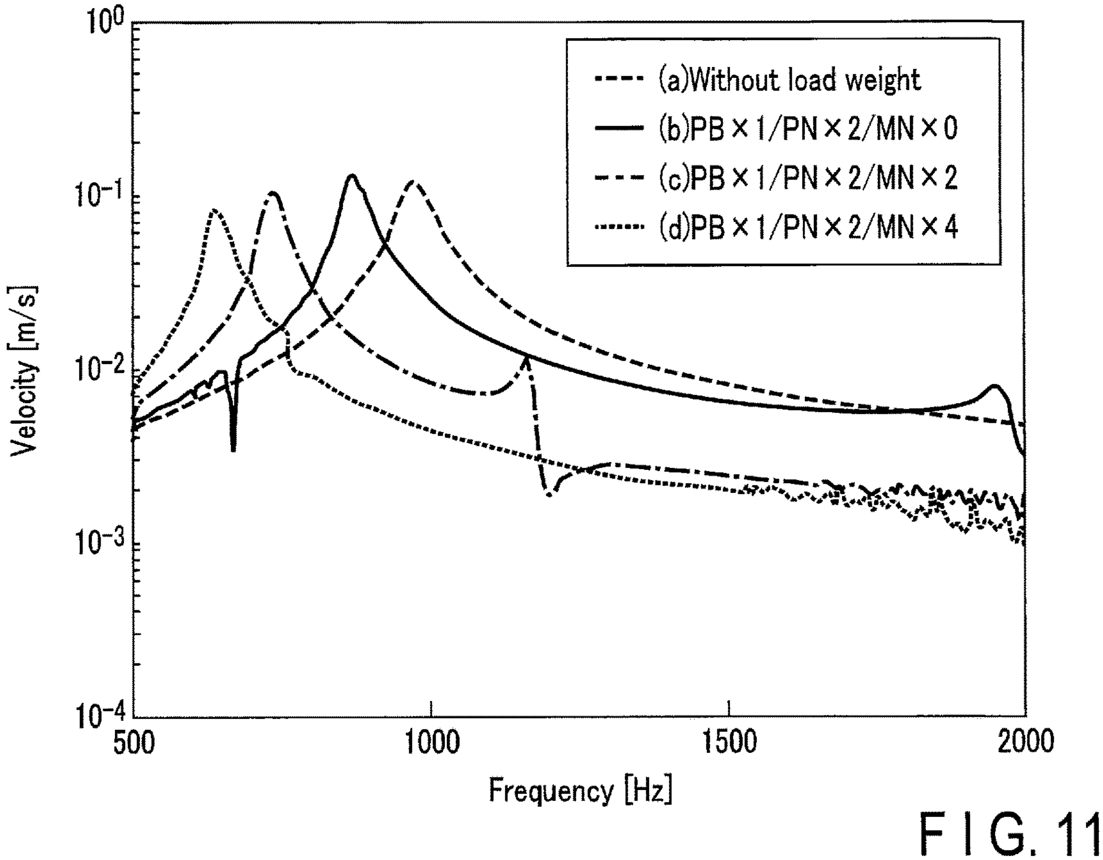
FIG. 11 is a graph showing the frequency characteristic of the axial vibration velocity of the vibrator according to the first embodiment, to which a load weight is attached.
Figure 12:
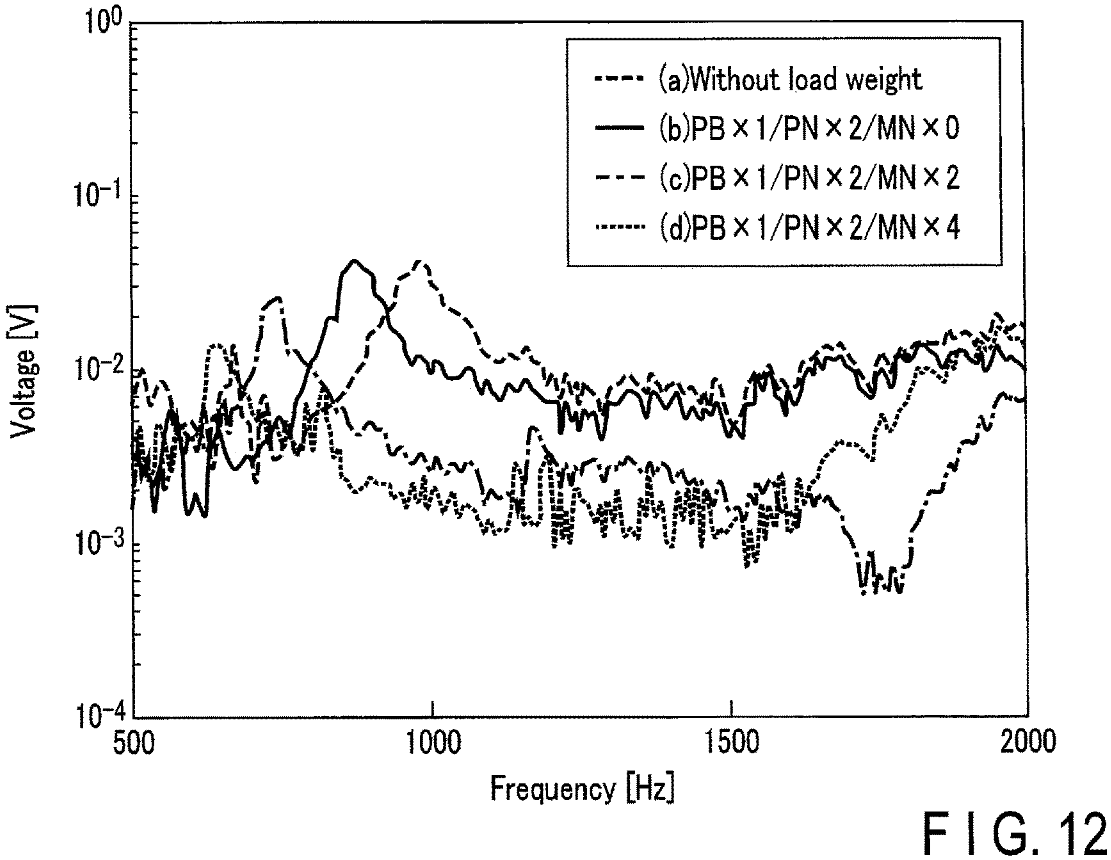
FIG. 12 is a graph showing the frequency characteristic of the radiated sound pressure of the sound emitting apparatus according to the first embodiment, in which a load weight is attached to the vibrator.
Figure 13:
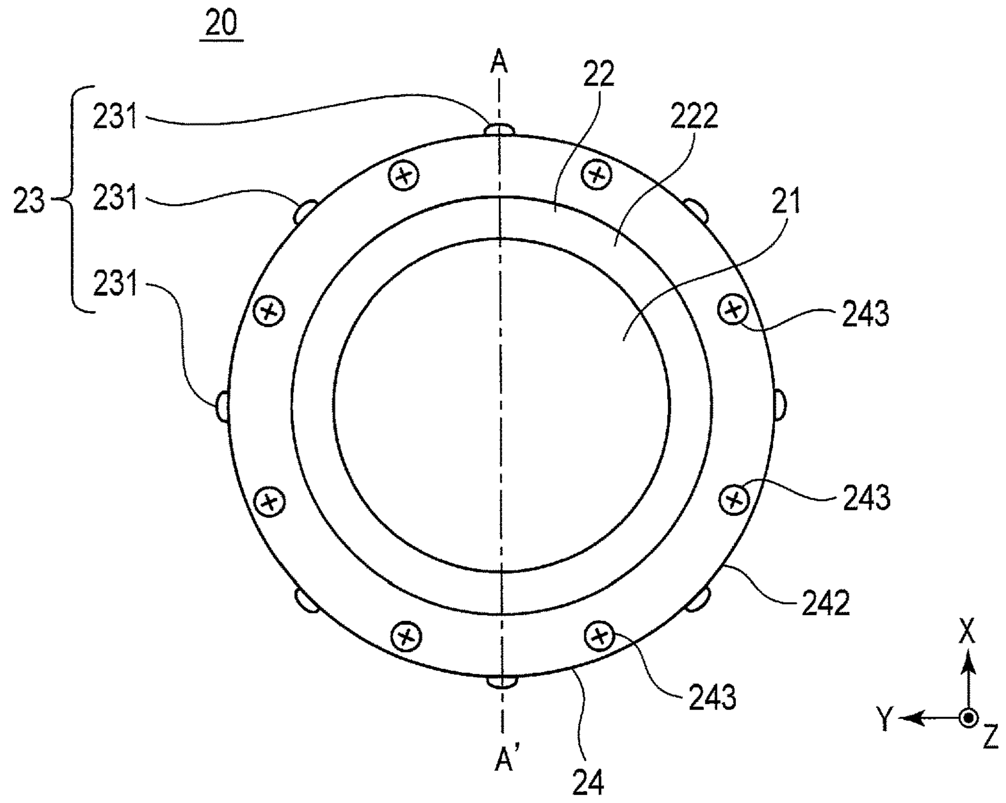
FIG. 13 is a front view showing a sound emitting apparatus according to the second embodiment.
Figure 14:
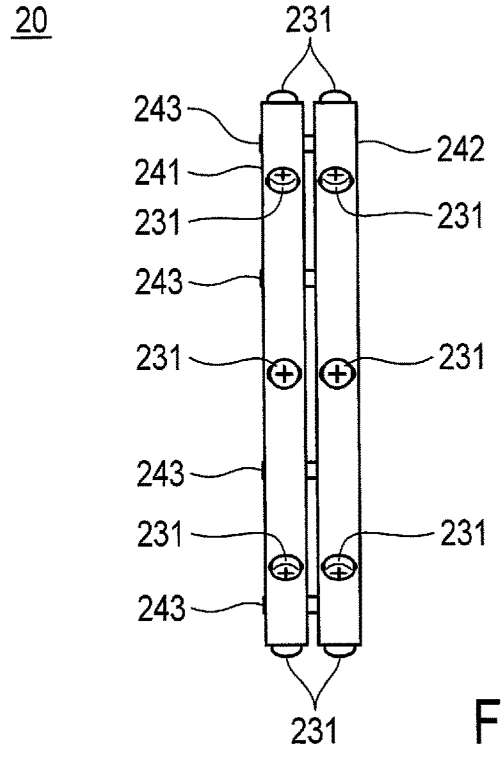
FIG. 14 is a side view showing the sound emitting apparatus according to the second embodiment.

FIG. 11 shows the frequency characteristic of the axial vibration velocity of the vibrator 11 measured by the above-described method, and FIG. 12 shows the frequency characteristic of the radiated sound pressure measured by the above-described method. Each of FIGS. 11 and 12 shows four results: (a) without load weight, (b) plastic bolt (PB)×1 & plastic nut (PN)×2, (c) plastic bolt×1 & plastic nut×2 & metal nut (MN)×2, and (d) plastic bolt×1 & plastic nut×2 & metal nut×4. As can be seen from FIGS. 11 and 12, the resonance frequency of the sound emitting apparatus 10 transitions to a lower frequency band along with the increase of the mass added to the vibrator 11.

As described above, the sound emitting apparatus includes the vibrator 11, the holding part 12 that holds the vibrator 11, and the fixing part 13 that fixes the holding part 12 to elastically support the holding part 12. For example, when the stiffness of the fixing part 13 is lower than the stiffness of the holding part 12, the fixing part 13 can elastically support the holding part 12. In this configuration, the vibrator 11 is elastically supported via the holding part 12. This makes the resonance frequency of the sound emitting apparatus 10 transition to the low frequency band. As a result, even the compact and lightweight apparatus can reproduce high-output low frequency sound.

To add a mass to the vibrator 11, the sound emitting apparatus 10 may further include the load weight 14 attached to the vibrator 11. In this configuration, the resonance frequency of the sound emitting apparatus 10 can be made to transition to a lower frequency band.

Second Embodiment

Figure 15:
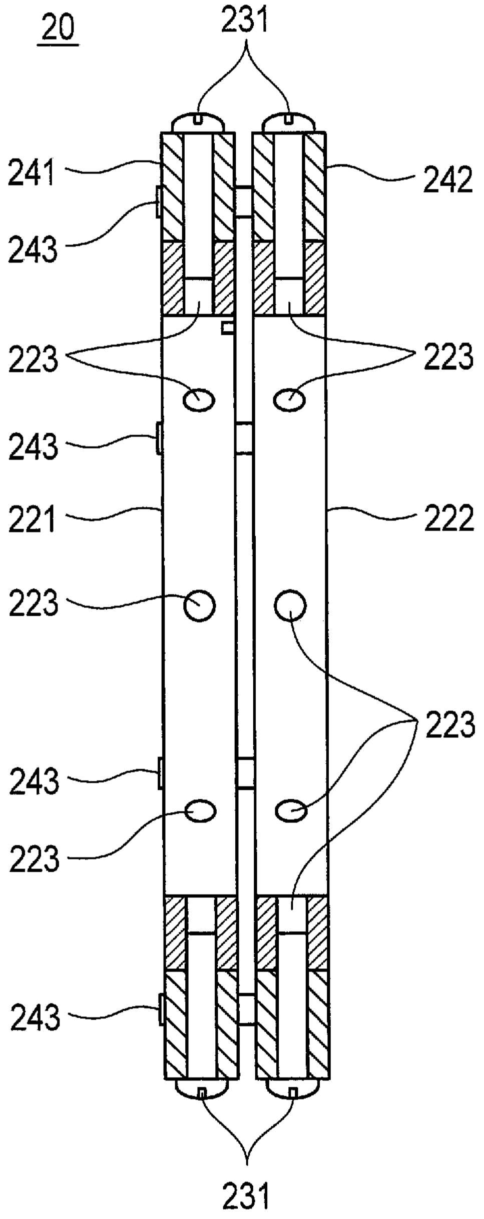
FIG. 15 is a sectional view showing the sound emitting apparatus according to the second embodiment.
Figure 16:
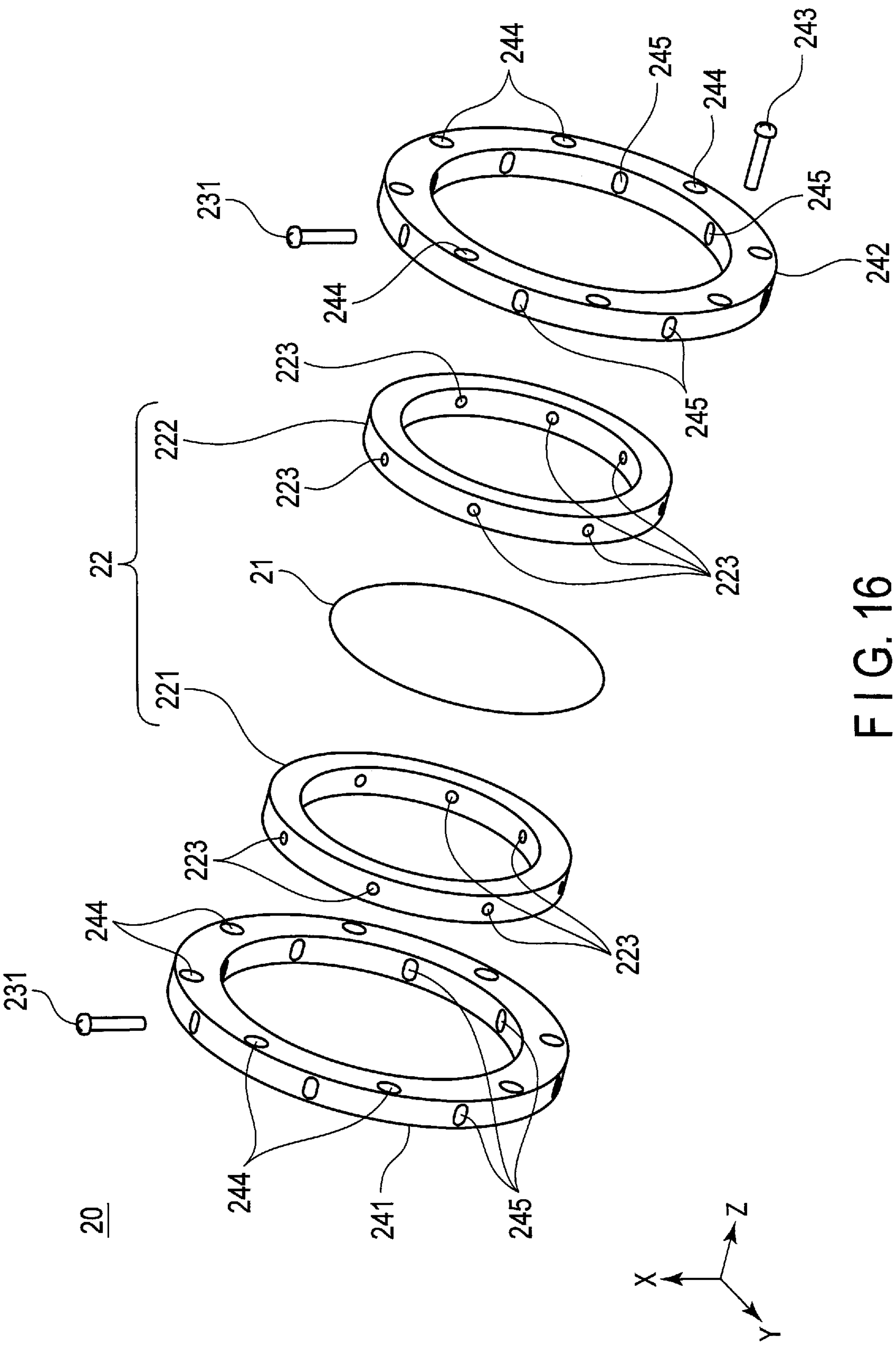
FIG. 16 is an exploded perspective view showing the sound emitting apparatus according to the second embodiment.

FIGS. 13, 14, 15, and 16 are a front view, a side view, a sectional view, and an exploded perspective view, respectively, schematically showing a sound emitting apparatus 20 according to the second embodiment. FIG. 15 shows a cross section of the sound emitting apparatus 20 taken along a line A-A' in FIG. 13. As shown in FIGS. 13, 14, 15, and 16, the sound emitting apparatus 20 includes a vibrator 21, a holding part 22, a supporting part 23, and a fixing part 24.

The vibrator 21 is the same as the vibrator 11 of the sound emitting apparatus 10 according to the first embodiment. Hence, a description of the vibrator 21 will be omitted.

The holding part 22 is the same as the holding part 12 of the sound emitting apparatus 10 according to the first embodiment. Specifically, the holding part 22 includes a pair of holding members 221 and 222 each of which holds the peripheral edge of the vibrator 21 by surface contact. Each of the holding members 221 and 222 includes a plurality of threaded through holes 223. The threaded through holes 223 extend along the radial direction of the sound emitting apparatus 20. In each of the holding members 221 and 222, the threaded through holes 223 are provided discretely in the circumferential direction of the sound emitting apparatus 20. In the example shown in FIGS. 13, 14, 15, and 16, in each of the holding members 221 and 222, eight threaded through holes 223 are provided at an angular interval of 45°.

The supporting part 23 supports the holding part 22, and the fixing part 24 fixes the supporting part 23. The stiffness of the supporting part 23 is lower than the stiffness of the holding part 22. In the present embodiment, the supporting part 23 includes a plurality of metal bolts 231 each serving as an elastic member. The fixing part 24 is a two split type metal annular holder including a plurality of threaded through holes. The fixing part 24 includes a pair of fixing members 241 and 242 each of which is made of a metal and has an annular shape, and a plurality of metal bolts 243. Each of the fixing members 241 and 242 is provided with a plurality of threaded through holes 244 and a plurality of threaded through holes 245. A metal is an example of an elastic material. The threaded through holes 244 extend along the axial direction (Z-axis) of the sound emitting apparatus 20, and the metal bolts 243 threadably engage with the threaded through holes 244. The fixing members 241 and 242 are fastened by the metal bolts 243. The threaded through holes 245 extend along the radial direction of the sound emitting apparatus 20, and the metal bolts 231 threadably engage with the threaded through holes 245. In each of the fixing members 241 and 242, the threaded through holes 245 are provided discretely in the circumferential direction. In the example shown in FIGS. 13, 14, 15, and 16, in each of the fixing members 241 and 242, eight threaded through holes 245 are provided at an angular interval of 45°.

The inner diameter of the fixing members 241 and 242 is slightly larger than the outer diameter of the holding members 221 and 222. In a state in which the threaded through holes 245 of the fixing member 241 face the threaded through holes 223 of the holding member 221, the fixing member 241 is arranged outside the holding member 221, and the metal bolts 231 threadably engage with the threaded through holes 245 of the fixing member 241 and the threaded through holes 223 of the holding member 221. In a state in which the threaded through holes 245 of the fixing member 242 face the threaded through holes 223 of the holding member 222, the fixing member 242 is arranged outside the holding member 222, and the metal bolts 231 threadably engage with the threaded through holes 245 of the fixing member 242 and the threaded through holes 223 of the holding member 222. The metal bolts 231 are arranged discretely along the outer periphery of the holding part 22. In the example shown in FIGS. 13, 14, 15, and 16, eight metal bolts 231 are arranged at an angular interval of 45° outside the holding member 221, and eight metal bolts 231 are arranged at an angular interval of 45° outside the holding member 222. When the metal bolts 231 are connected to the outer periphery of the holding part 22, beam-style elastic support can be achieved.

Note that the supporting part 23 shown in FIGS. 13, 14, 15, and 16 is merely an example, and the configuration of the supporting part 23 is not limited to the above-described configuration. The supporting part 23 may be formed by a plurality of plastic bolts or a film-shaped elastic member (for example, a rubber sheet). If the supporting part 23 is a rubber sheet, the supporting part 23 is arranged between the holding part 22 and the fixing part 24.

The shapes of the components shown in FIGS. 13, 14, 15, and 16 are merely examples, and are not limited to these. For example, the vibrator 21, the holding part 22, and the fixing part 24 may have a polygonal shape.

Furthermore, a load weight may be attached to the vibrator 21 to make the resonance frequency of the sound emitting apparatus 20 transition to a lower frequency band.

Figure 17:
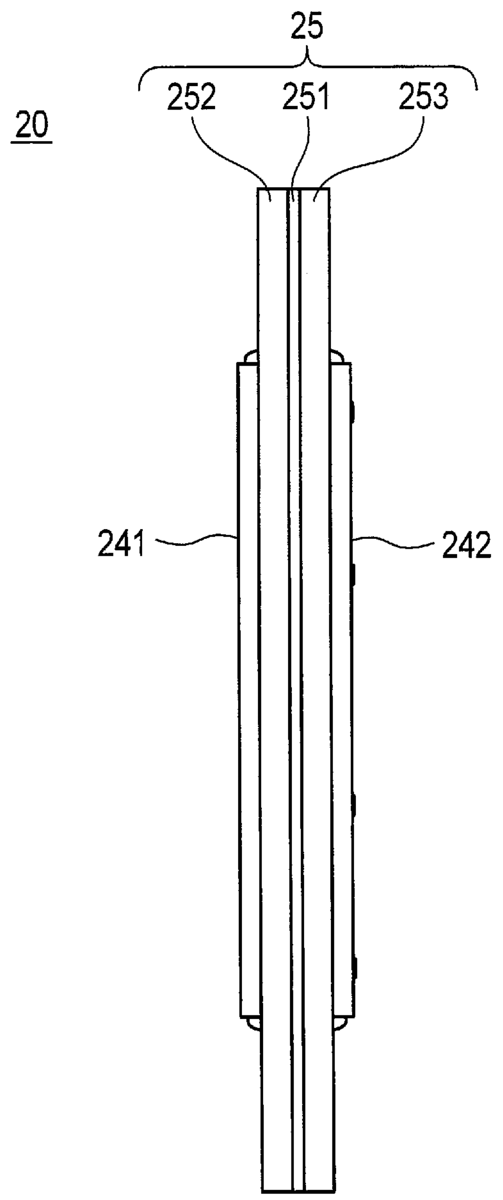
FIG. 17 is a side view showing the sound emitting apparatus according to the second embodiment.
Figure 18:
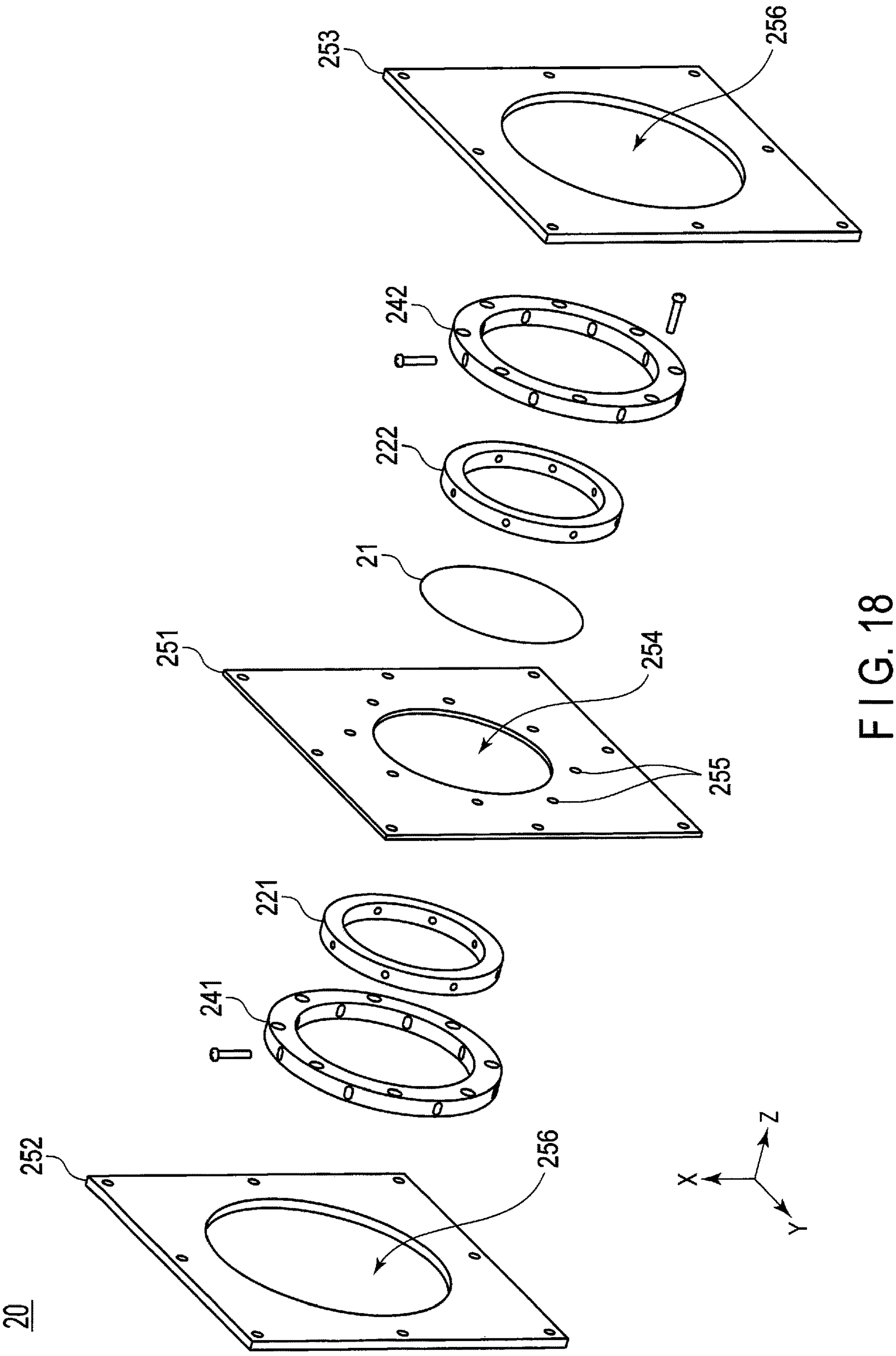
FIG. 18 is an exploded perspective view showing the sound emitting apparatus according to the second embodiment.

As shown in FIGS. 17 and 18, the sound emitting apparatus 20 may further include an installation part 25 configured to install the sound emitting apparatus 20 in an arbitrary structure (for example, a resonant cavity). In the example shown in FIGS. 17 and 18, the installation part includes a base member 251 and frame members 252 and 253. The base member 251 includes a through hole 254 at the center, and a plurality of through holes 255 around the through hole 254. The diameter of the through hole 254 is slightly larger than the outer diameter of the holding part 22. The base member 251 is arranged between the fixing members 241 and 242 of the fixing part 24 and attached to the fixing part 24. In a state in which the base member 251 is attached to the fixing part 24, the vibrator 21 is located in the through hole 254. The metal bolts 243 are inserted into the through holes 255. The base member 251 is made of, for example, an elastic material. As the base member 251, for example, a rubber sheet can be used. The stiffness of the installation part 25 (specifically, the base member 251) is lower than the stiffness of the fixing part 24 (specifically, the fixing members 241 and 242).

Each of the frame members 252 and 253 includes a through hole 256 at the center. The diameter of the through hole 256 is slightly larger than the outer diameter of the fixing members 241 and 242. The base member 251 is arranged between the frame members 252 and 253 and attached to the frame members 252 and 253 using, for example, a combination of bolts and nuts. In a state in which the base member 251 is attached to the frame members 252 and 253, the holding member 221 and the fixing member 241 are located in the through hole 256 of the frame member 252, and the holding member 222 and the fixing member 242 are located in the through hole 256 of the frame member 253. The frame members 252 and 253 correspond to frame bodies attachable to a structure. As the frame members 252 and 253, for example, metal frame bodies can be used.

Figure 19:
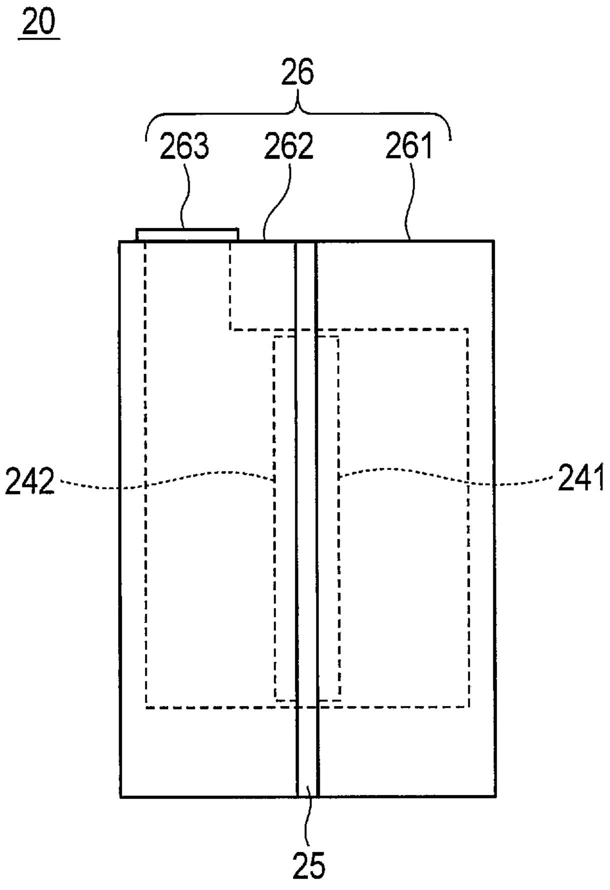
FIG. 19 is a side view showing the sound emitting apparatus according to the second embodiment.
Figure 20:
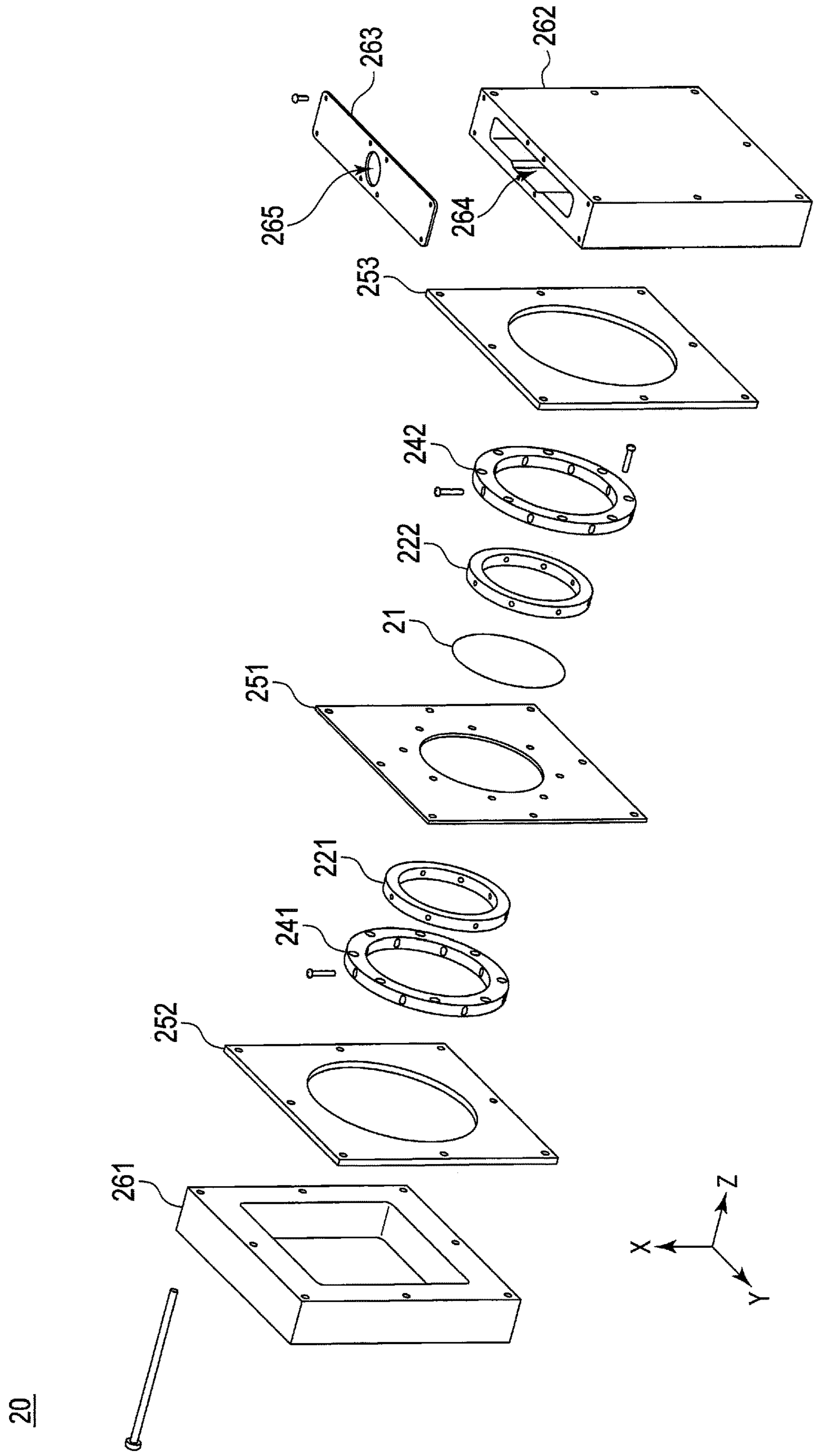
FIG. 20 is an exploded perspective view showing the sound emitting apparatus according to the second embodiment.

To increase the radiation sound pressure at the resonance frequency of the sound emitting apparatus 20, the sound emitting apparatus 20 may further include a resonant cavity 26 having a resonance frequency substantially equal to the natural frequency of the vibrator 21, as shown in FIGS. 19 and 20. That the resonance frequency of the resonant cavity 26 substantially equals the natural frequency of the vibrator 21 means that the resonance frequency of the resonant cavity 26 falls within the frequency range of 200 Hz with respect to the natural frequency of the vibrator 21 as the center. If the natural frequency of the vibrator 21 is f Hz, the resonance frequency of the resonant cavity 26 is set within the frequency range from (f−100) Hz to (f+100) Hz.

Note that the configuration of the installation part 25 is not limited to the above-described configuration. For example, the base member 251 may be omitted, and the fixing part 24 (more specifically, the fixing members 241 and 242) may be attached to the frame members 252 and 253.

The vibrator 21, the holding part 22, the supporting part 23, and the fixing part 24 are arranged in the resonant cavity 26 and attached to the resonant cavity 26 via the installation part 25. The resonant cavity 26 includes case bodies 261 and 262, and a plate 263. The case bodies 261 and 262 form an internal space in which the vibrator 21, the holding part 22, the supporting part 23, and the fixing part 24 are arranged. The case bodies 261 and 262 are fastened by, for example, bolts. An opening 264 that makes the internal space and the external space communicate is provided in the case body 262, and the plate 263 is attached to the opening 264 of the case body 262. The plate 263 includes a sound radiation aperture 265 configured to radiate sound generated by the vibrator 21 to the external space. The shapes of the case bodies 261 and 262 and the plate 263 are designed such that the resonance frequency of the resonant cavity 26 substantially equals the natural frequency of the vibrator 21.

The installation part 25 and/or the resonant cavity 26 may also be applied to the sound emitting apparatus 10 according to the first embodiment.

A test for verifying the effectiveness of the configuration of the sound emitting apparatus 20 shown in FIGS. 17 and 18 was conducted. In the test, the axial vibration velocity of the vibrator 21 and the radiated sound pressure from the vibrator 21 were measured by the same method as described in the first embodiment. As the vibrator 21, a bimorph transducer including a metal plate (stainless steel) and piezoelectric elements (lead zirconate titanate (PZT)) provided on both surfaces of the metal plate was used. An outer diameter Ro of the vibrator 21 was 45 mm. A through hole (inner diameter Ri: 3 mm) was provided at the center of the vibrator 21. As the holding part 22, a two split type metal annular holder (aluminum alloy) was used. As the supporting part 23, a bolt (stainless steel) was used. As the fixing part 24, a two split type metal annular holder (aluminum alloy) was used. As the installation part 25, a rubber sheet (silicone, hardness: Shore A50) and a metal frame body (aluminum alloy) were used. Also, a load weight was attached to the vibrator 21 by the same method as described in the first embodiment. That is, a plastic bolt was inserted into a through hole provided at the center of the vibrator 21, and a plastic nut was threadably engaged with the plastic bolt, thereby attaching the load weight to the vibrator 21. To increase the mass added to the vibrator 21, a metal nut was added to the rear stage of the plastic nut.

Figure 21:
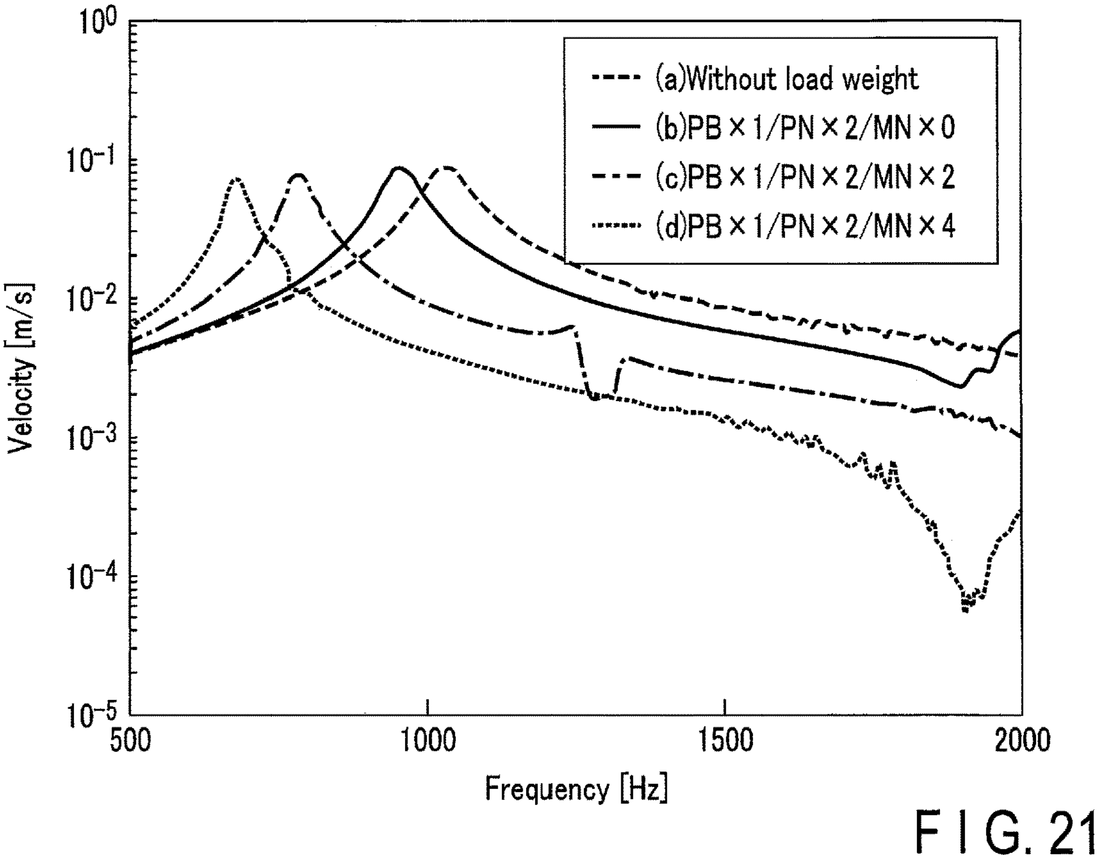
FIG. 21 is a graph showing the frequency characteristic of the axial vibration velocity of a vibrator according to the second embodiment.
Figure 22:
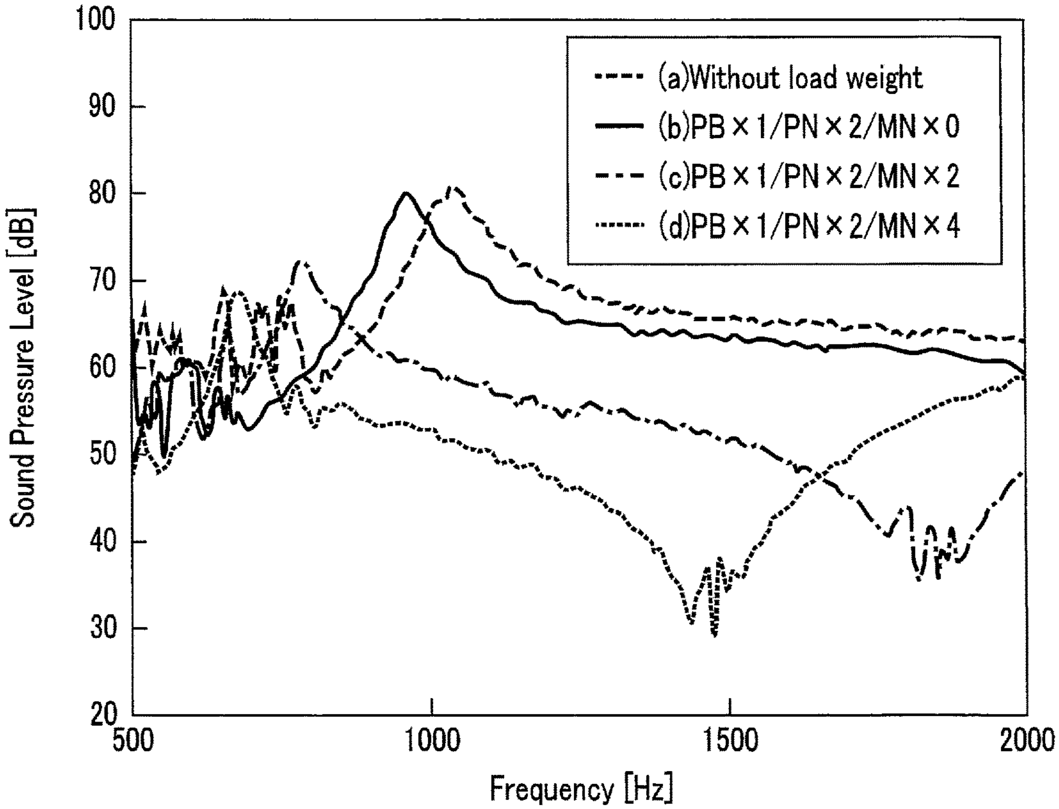
FIG. 22 is a graph showing the frequency characteristic of the radiated sound pressure of the sound emitting apparatus according to the second embodiment.

FIG. 21 shows the frequency characteristic of the axial vibration velocity of the vibrator 21 measured by the above-described method, and FIG. 22 shows the frequency characteristic of the radiated sound pressure measured by the above-described method. Each of FIGS. 21 and 22 shows four results: (a) without load weight, (b) plastic bolt×1 & plastic nut×2, (c) plastic bolt×1 & plastic nut×2 & metal nut×2, and (d) plastic bolt×1 & plastic nut×2 & metal nut×4. As shown in FIGS. 21 and 22, the resonance frequency of the sound emitting apparatus 20 is lower than the primary resonance frequency of the vibrator 21. Hence, according to the above-described configuration of the sound emitting apparatus 20, the resonance frequency can be made to transition to a low frequency band. As can be seen from FIGS. 21 and 22, the resonance frequency of the sound emitting apparatus 20 transitions to the low frequency band along with the increase of the mass added to the vibrator 21.

However, the radiation sound pressure decreases along with the increase of the mass added to the vibrator 21.

Figure 23:
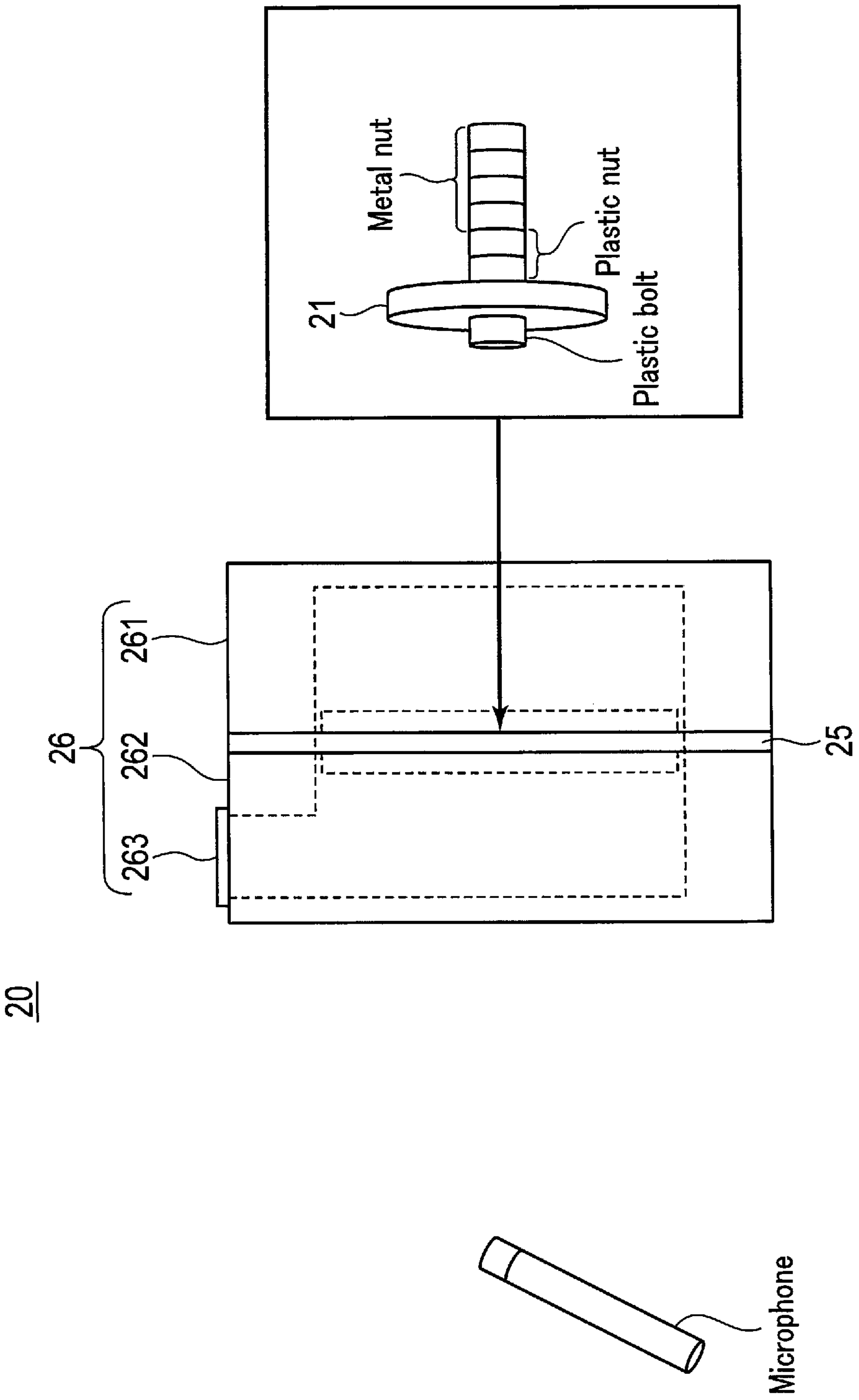
FIG. 23 is a view for explaining the outline of a principle verification test for a method according to the second embodiment.

Next, a test for verifying the effectiveness of the resonant cavity 26 was conducted. The test was conducted by a method shown in FIG. 23. Specifically, a radiation sound pressure at a sound pressure observation point apart from the sound radiation aperture 265 of the resonant cavity 26 by a predetermined distance was measured by a microphone. In addition, a load weight (plastic bolt×1 & plastic nut×2 & metal nut×4) was attached to the vibrator 21.

Figure 24:
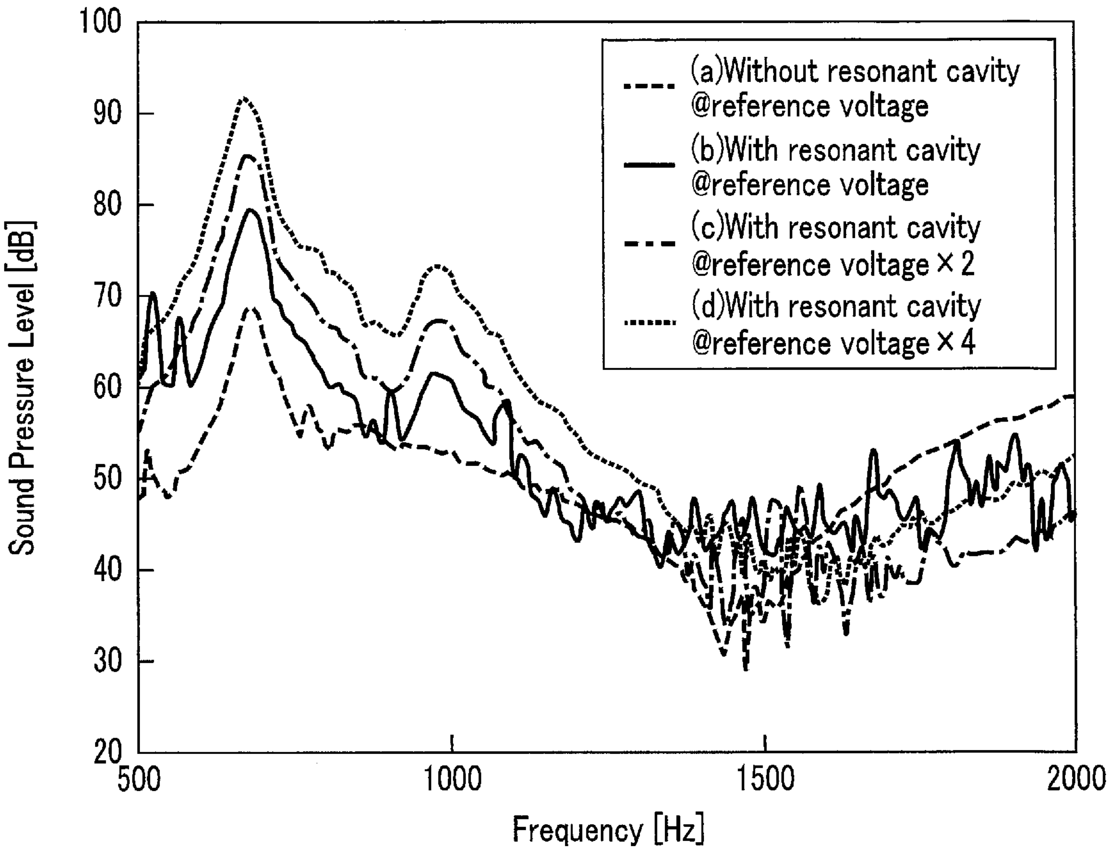
FIG. 24 is a graph showing the frequency characteristic of the radiated sound pressure of the sound emitting apparatus according to the second embodiment.

FIG. 24 shows the frequency characteristic of the radiation sound pressure measured by the above-described method. FIG. 24 shows four results: (a) without resonant cavity, reference voltage is applied, (b) with resonant cavity, reference voltage is applied, (c) with resonant cavity, voltage twice larger than reference voltage is applied, and (d) with resonant cavity, voltage four times larger than reference voltage is applied. As can be seen from FIG. 24, when the resonant cavity 26 is provided, the radiation sound pressure at the resonance frequency of the sound emitting apparatus 20 increases. It is also found that the radiation sound pressure linearly increases with respect to the voltage applied to the vibrator 21.

As described above, the sound emitting apparatus includes the vibrator 21, the holding part 22 that holds the vibrator 21, the supporting part 23 that holds the holding part 22, and the fixing part 24 that fixes the supporting part 23. For example, when the stiffness of the supporting part 23 is lower than the stiffness of the holding part 22, the supporting part 23 can elastically support the holding part 22. In this configuration, the vibrator 21 is elastically supported via the holding part 22. This makes the resonance frequency of the sound emitting apparatus 20 transition to the low frequency band. As a result, even the compact and lightweight apparatus can reproduce high-output low frequency sound.

The supporting part 23 and the fixing part 24 are arranged outside the holding part 22. For example, the supporting part 23 may be formed by elastic members (for example, metal bolts) arranged discretely along the outer periphery of the holding part 22. This can make the apparatus thin. Specifically, the size of the sound emitting apparatus 20 in the axial direction can be reduced.

The sound emitting apparatus 20 may further include the installation part 25. This makes it easy to attach the sound emitting apparatus 20 to a structure.

The sound emitting apparatus 20 may further include the resonant cavity 26 having a resonance frequency that is substantially equal to the natural frequency of the vibrator 21. This makes it possible to output sound at the resonance frequency of the sound emitting apparatus 20 in higher output.

To add a mass to the vibrator 21, the sound emitting apparatus 20 may further include a load weight attached to the vibrator 21. In this configuration, the resonance frequency of the sound emitting apparatus 20 can be made to transition to a lower frequency band.

Third Embodiment

In the first and second embodiments, the holding part that holds the vibrator is elastically supported, thereby making the resonance frequency of the sound emitting apparatus transition to the low frequency band. The resonance frequency of the sound emitting apparatus can also be made to transition to the low frequency band by a method to be described below. The method to be described in the third embodiment may be used solely, or may be combined with the method described in the first embodiment and/or the second embodiment.

It is known that the joint state between two objects affects the stiffness of a system. This stiffness is called a contact stiffness, and the material, surface roughness, contact area, and the like of the joint surface contribute to the contact stiffness. In the sound emitting apparatus (for example, a sound emitting apparatus 10 or a sound emitting apparatus 20) according to the embodiment, the contact stiffness between the vibrator and the holding part affects the natural frequency of the vibrator. Hence, when the contact stiffness between the vibrator and the holding part is adjusted (specifically, lowered), the resonance frequency of the sound emitting apparatus can be made to transition to the low frequency band.

As methods of adjusting the contact stiffness, for example, the following three methods may be used.

(1) The material of the holding part is changed.
(2) The surface roughness of the holding part is changed.
(3) The contact area between the vibrator and the holding part is changed.

In the method (1), as the material of the holding part, a material (for example, an elastic material such as plastic) whose stiffness is lower than the material of the vibrator is used. For example, if the vibrator is a bimorph type piezoelectric transducer as shown in FIG. 5, the holding part holds a metal plate. The holding part is made of a material whose stiffness is lower than the stiffness of the material of the metal plate.

In the method (2), in the contact region between the vibrator and the holding part, the surface roughness of the holding part is made higher (larger) than the surface roughness of the vibrator. In other words, the surface roughness of the region of the holding part in contact with the vibrator is larger than the surface roughness of the region of the vibrator in contact with the holding part.

Figure 25A:
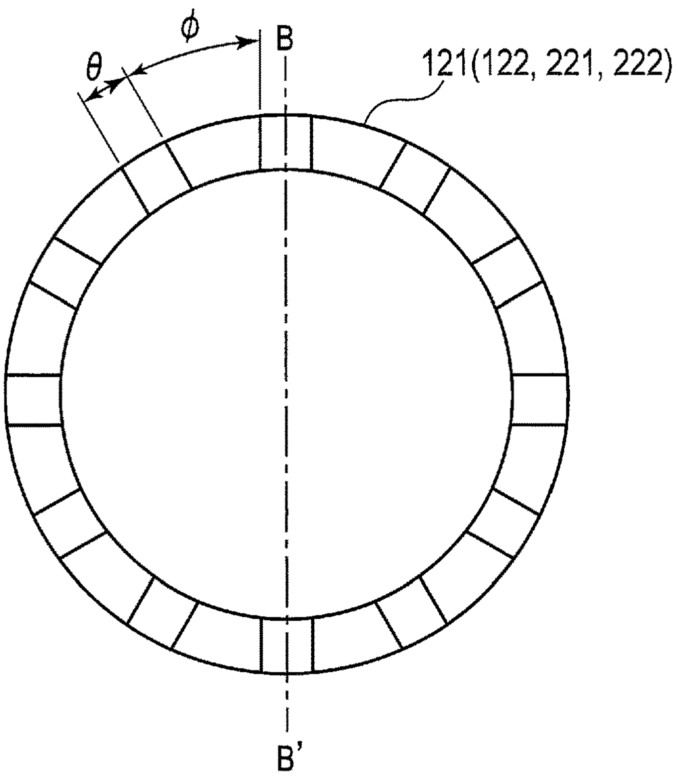
FIG. 25A is a front view showing a holding part according to the third embodiment.
Figure 25B:
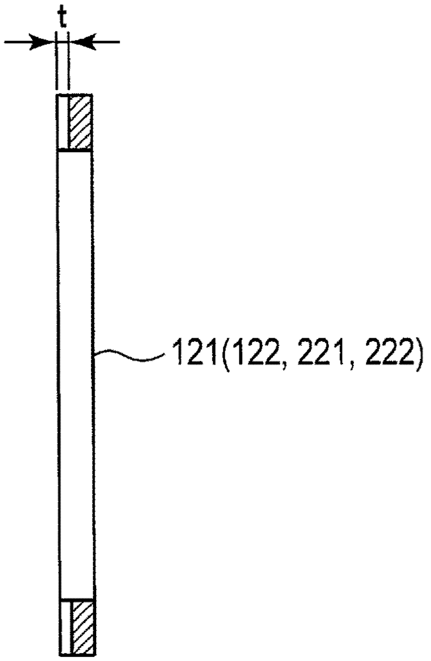
FIG. 25B is a sectional view showing a holding part according to the third embodiment.

In the method (3), in the contact region between the vibrator and the holding part, the surface area of the holding part is made smaller than the surface area of the vibrator. In other words, the surface area of the region of the holding part in contact with the vibrator is smaller than the surface area of the region of the vibrator in contact with the holding part. As an example of the method of making the surface area of the holding part smaller than the surface area of the vibrator in the contact region between the vibrator and the holding part, as shown in FIGS. 25A and 25B, the surface of the holding part (for example, each of holding members 121 and 122 shown in FIG. 1 or each of holding members 221 and 222 shown in FIG. 16) is formed into a comb-tooth shape. FIG. 25B shows a cross section of the holding part taken along a line B-B' in FIG. 25A. A plurality of (12, in this example) concave portions having a thickness t are provided on the surface of the holding part.

Figure 26:
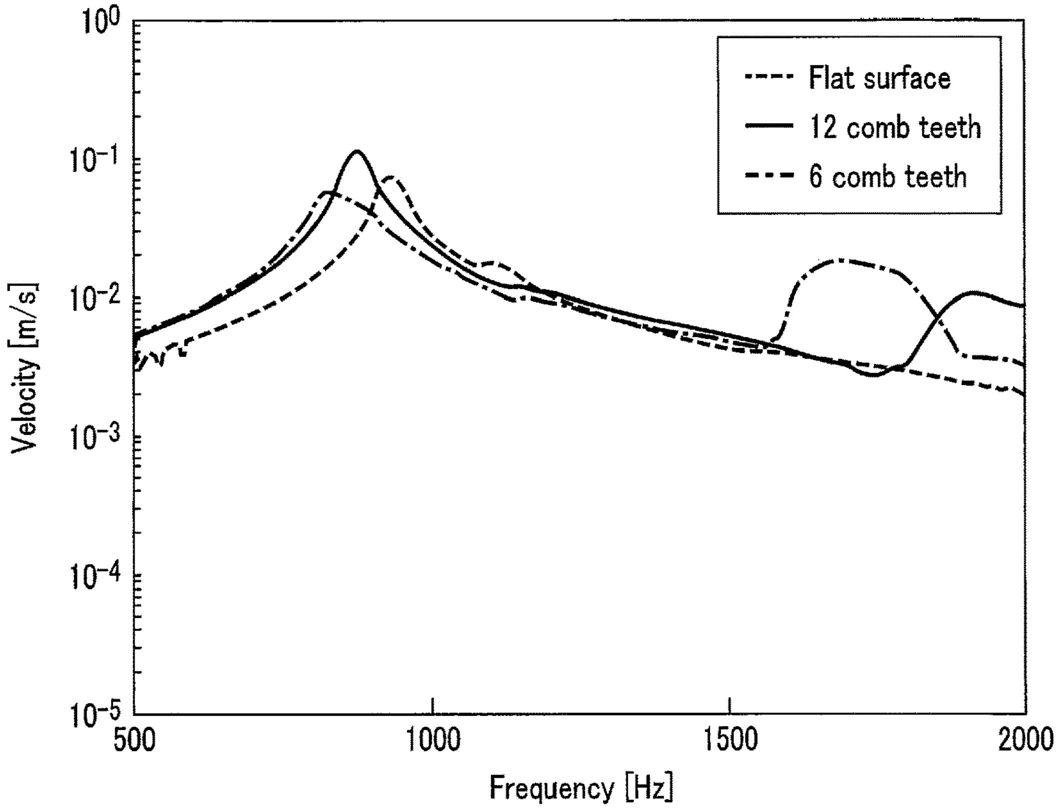
FIG. 26 is a graph showing the frequency characteristic of the axial vibration velocity of a vibrator according to the third embodiment.
Figure 27:
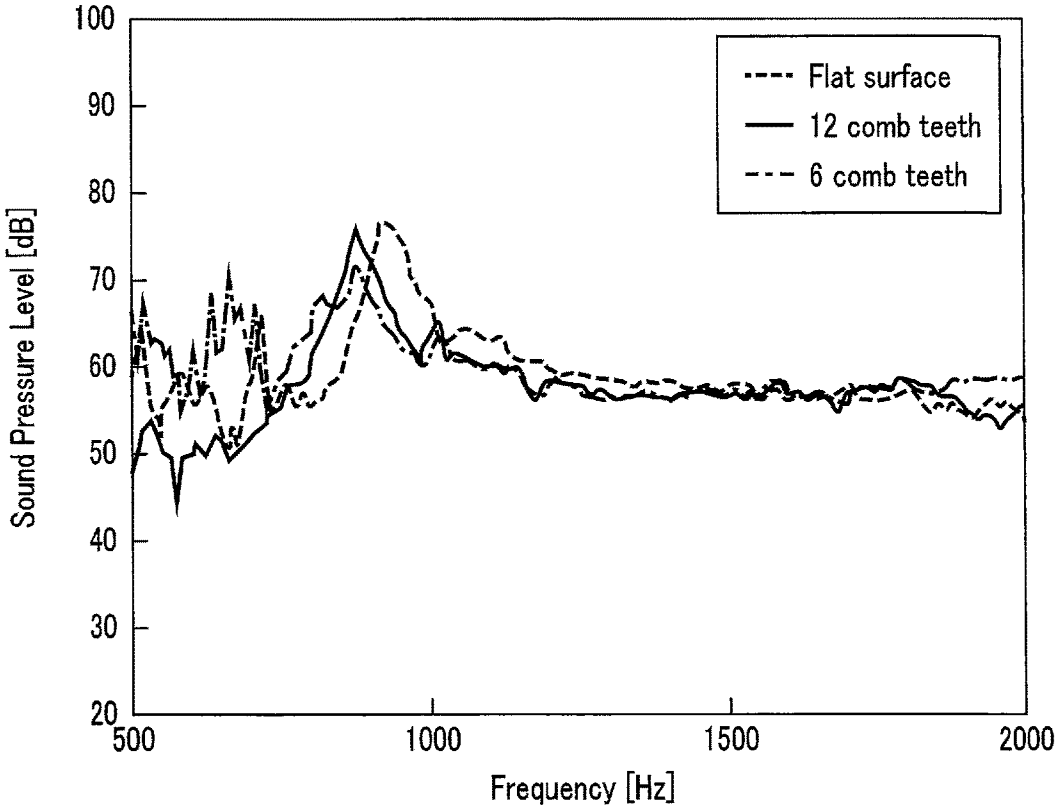
FIG. 27 is a graph showing the frequency characteristic of the radiated sound pressure of a sound emitting apparatus according to the third embodiment.

FIGS. 26 and 27 show the results of a test for verifying the effectiveness of the comb-tooth shaped surface of the holding part. For the test, a holding part 22 of the sound emitting apparatus 20 shown in FIGS. 13, 14, 15, and 16, which has a comb-tooth shaped surface, was used. FIG. 26 shows the frequency characteristic of the axial vibration velocity of a vibrator 21, and FIG. 27 shows the frequency characteristic of a radiated sound pressure from the sound emitting apparatus 20. Each of FIGS. 26 and 27 shows three results: (a) flat surface, (b) 12 comb teeth (t: 1 mm, θ: 10°, ϕ:20°), and (c) 6 comb teeth (t: 1 mm, θ: 50°, ϕ: 20°). As can be seen from FIGS. 26 and 27, the resonance frequency of the sound emitting apparatus transitions to a low frequency band when the holding part is formed into a comb-tooth shape. However, the surface shape shown in FIGS. 25A and 25B is merely an example, and the method of making the surface area of the holding part smaller than the surface area of the vibrator in the contact region between the vibrator and the holding part is not limited to this.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sound emitting apparatus comprising:

a vibrator comprising a metal plate and a piezoelectric element, the vibrator having a principal surface;

a holding part configured to hold the vibrator; and a fixing part configured to fix the holding part, wherein a stiffness of the fixing part is lower than a stiffness of the holding part, the holding part includes an annular first holding member and an annular second holding member, the first holding member and the second holding member sandwich a peripheral edge of the vibrator, the fixing part includes an annular first fixing member provided with a plurality of through holes, an annular second fixing member provided with a plurality of through holes, a plurality of bolts, and a plurality of nuts, the first fixing member and the second fixing member sandwich both end faces of the holding part, and the bolts are arranged along an axial direction perpendicular to the principal surface of the vibrator, are inserted into the through holes of the first fixing member and the through holes of the second fixing member, and fasten the first fixing member and the second fixing member by a threaded engagement of the nuts with the holts.

2. The apparatus according to claim 1, wherein the vibrator is a piezoelectric transducer.

3. The apparatus according to claim 1, wherein the holding part holds a peripheral edge of the vibrator by surface contact.

4. The apparatus according to claim 1, wherein the holding part is made of a material having a stiffness lower than a stiffness of a material of the metal plate.

5. The apparatus according to claim 1, wherein a surface roughness of a region of the holding part in contact with the vibrator is higher than a surface roughness of a region of the vibrator in contact with the holding part.

6. The apparatus according to claim 1, wherein a surface area of a region of the holding part in contact with the vibrator is smaller than a surface area of a region of the vibrator in contact with the holding part.

7. A sound emitting apparatus comprising:

a vibrator comprising a metal plate and a piezoelectric element;

a holding part configured to hold the vibrator;

a supporting part configured to support the holding part; and a fixing part configured to fix the supporting part, wherein the holding part includes an annular first holding member and an annular second holding member, the first holding member and the second holding member sandwich a peripheral edge of the vibrator, the fixing part has an annular shape, an inner diameter of the fixing part is larger than an outer diameter of the first holding member and an outer diameter of the second holding member, the fixing part is arranged outside the first holding member and the second holding member, and the supporting part is connected to an outer periphery of the holding part.

8. The apparatus according to claim 7, wherein a stiffness of the supporting part is lower than a stiffness of the holding part.

9. The apparatus according to claim 7, further comprising an installation part configured to install the sound emitting apparatus in a structure, wherein the installation part is attached to the fixing part.

10. The apparatus according to claim 9, wherein a stiffness of the installation part is lower than a stiffness of the fixing part.

11. The apparatus according to claim 7, further comprising a resonant cavity having a resonance frequency substantially equal to a natural frequency of the vibrator.

12. The apparatus according to claim 7, wherein the vibrator is a piezoelectric transducer.

13. The apparatus according to claim 7, wherein the holding part is made of a material having a stiffness lower than a stiffness of a material of the metal plate.

14. The apparatus according to claim 7, wherein a surface roughness of a region of the holding part in contact with the vibrator is higher than a surface roughness of a region of the vibrator in contact with the holding part.

15. The apparatus according to claim 7, wherein a surface area of a region of the holding part in contact with the vibrator is smaller than a surface area of a region of the vibrator in contact with the holding part.

16. The apparatus according to claim 7, wherein the supporting part comprises a plurality of bolts, the fixing part comprises a plurality of threaded through holes extending along a radial direction, and the bolts are threadably engage with the threaded through holes.

17. The apparatus according to claim 7, wherein the supporting part includes an elastic member arranged between the holding part and the fixing part.

18. The apparatus according to claim 7, wherein the vibrator has a principal surface, and the fixing part comprises:

an annular first fixing member whose inner diameter is larger than the outer diameter of the first holding member, the first fixing member being arranged outside the first holding member, the first fixing member being provided with a plurality of first threaded through holes extending along a direction perpendicular to the principal surface, an annular second fixing member whose inner diameter is larger than the outer diameter of the second holding member, the second fixing member being arranged outside the second holding member, the second fixing member being provided with a plurality of first threaded through holes extending along the direction perpendicular to the principal surface, and a plurality of first bolts configured to fasten the first fixing member and the second fixing member via the first threaded through holes of the first fixing member and the first threaded through holes of the second fixing member.

19. The apparatus according to claim 18, wherein the supporting part comprises a plurality of second bolts and a plurality of third bolts, the first fixing member is provided with a plurality of second threaded through holes extending along a radial direction, the second fixing part is provided with a plurality of second threaded through holes extending along a radial direction, the second bolts threadably engage with the second threaded through holes of the first fixing member, and the third bolts threadably engage with the second threaded through holes of the second fixing member.

20. The apparatus according to claim 7, wherein the holding part is a single member in which the first holding member and the second holding member are integrally formed.

* * * * *